United States Patent [19]

Sanada et al.

[11] 3,838,988

[45] Oct. 1, 1974

[54] METHOD OF MANUFACTURING BRIQUETS AND COKE IN THE MOLDED FORM WITH ASPHALT AS THE BINDER

[75] Inventors: Yuzo Sanada; Shinjiro Watari, both of Kawaguchi; Akira Takahashi, Wako; Takashi Watanabe, Urawa; Ziro Sekiya, Funabashi, all of Japan

[73] Assignees: Agency of Industrial Science and Technology; Mifuji Iron Works Co., Ltd., both of Tokyo, Japan

[22] Filed: June 4, 1973

[21] Appl. No.: 366,574

[30] Foreign Application Priority Data
June 12, 1972 Japan.............................. 47-58390

[52] U.S. Cl..................... 44/23, 44/10 H, 44/10 K, 201/6, 201/21
[51] Int. Cl........ C10l 5/16, C10l 5/40, C01b 47/20
[58] Field of Search ........ 44/23, 10 H, 10 K; 201/6, 201/8, 21, 44; 75/42

[56] References Cited
UNITED STATES PATENTS
| | | | |
|---|---|---|---|
| 3,001,856 | 9/1961 | Reerink et al. | 44/23 |
| 3,403,989 | 10/1968 | Blake et al. | 44/23 |
| 3,700,564 | 10/1972 | Willibald et al. | 201/6 |

FOREIGN PATENTS OR APPLICATIONS
| | | | |
|---|---|---|---|
| 897,755 | 5/1962 | Great Britain | 44/23 |

*Primary Examiner*—C. Dees
*Attorney, Agent, or Firm*—Toren, McGeady and Stanger

[57] ABSTRACT

Briquets are manufactured by kneading in a hot blow atmosphere coal dust blended with asphalt containing 55–65 percent n-hexane soluble matter as the binder in a particular ratio and molding the kneaded blend under heat-compression. These briquets are further heat-cured in an oxidizing atmosphere and then calcined in an inert gas, to produce coke in the molded form. The resulting products have all the properties required for use in blast furnaces.

4 Claims, No Drawings

METHOD OF MANUFACTURING BRIQUETS AND COKE IN THE MOLDED FORM WITH ASPHALT AS THE BINDER

SUMMARY OF THE INVENTION

This invention relates to the manufacture of molded briquets and coke in the molded form from anthracite, lignite or coke breeze (coke in the powdery form) as the raw material and with asphalt as the binder.

Conventional molded briquets or coke, employed as a fuel reductant in the blast furnace, have been manufactured usually by compressing and molding coal dust with coal-tar pitch as the binder. More particularly, in the production of the conventional briquets, well-dried coal dust is blended with coal-tar pitch powders, and the blend is kneaded at temperatures of 80°–120°C and, thereupon, subjected to molding in desired sizes by means of a briqueting machine, to produce finished briquets. The briquets thus produced are further subjected to the dry distillation in a coke oven at 900°–1,400°C, so that the volatile content may be removed, to finally resulting in coke.

The above-described processes of producing briquets and coke appears to be rather simple, but, as a matter of disadvantage, it needs the accumulation of special studies on such various factors as the properties of the raw materials and binding substances, the determination of the blending and kneading conditions, and the construction and operating conditions of the coke oven, as well as many years' experience in the same operation.

The present invention proposes to provide a method of manufacturing briquets and coke in the molded form where asphalt which has recently been turned out in increased quantities as a by-product in the petroleum industry is used in place of such coal-tar pitch as used in the conventional process, so that the finished products may be obtained in far lower costs and in quantities enough to meet the increasing demand.

According to the method of the invention, 10–20 parts by weight of asphalt containing 55–65 percent n-hexane soluble matter and having a controlled binding component are blended with 90–80 parts by weight of coal dust or coke breeze, and then kneaded at temperatures of 200°–300°C; the resulting paste-like material is subjected to further kneading under blows heated at 200°–300°C till it becomes granulated; and thereupon it is applied for heat-compression and molding, to produce briquets. Further, according to the invention, the briquets thus produced are cured at 200°–280°C in the oxidizing atmosphere and further calcined at temperatures up to 900°–1,400°C in the inert atmosphere for coking.

In attempting to use asphalt as the new binding agent in the manufacture of molded briquets and coke, tests were first carried out with the use of asphalt pitch in a manner and under conditions similar to the traditional case with coal-tar pitch, but the performance resulted unsatisfactorily. The reason for this unsatisfactory results may be assigned that the asphalt pitch had been formed by different processes with different heat treatments and consequently endowed with a different chemical structure from the coal-tar pitch, though their respective industrial analyses exhibited more or less the same values. The blends prepared by mixing and heating the coal-tar pitch and the asphalt pitch, separately, with the same coal dust are quite different from each other in appearance and touch.

As the result of subsequent studies on suitable binders, it has been discovered that, among various properties required of a binder, its affinity to coal dust is the most important and that such affinity is influenced by the n-hexane soluble matter contained in asphalt, with very favorable results obtainable only when this constituent is present in a certain ratio. Accordingly, it has been ascertained that the spreading of asphalt component extensively over the coal dust particles by means of the kneading process can be satisfactorily available only when the asphalt contains the n-hexane soluble matter in a certain range. Based upon these discovery and ascertainment, the present invention has been completed.

The asphalt useful as the binder according to the invention essentially contains the n-hexane soluble matter in the range of from about 55 to about 65 percent. If it is over that range, the soluble matter would tend to break out of the mold during the heat-molding process of the briquet manufacture; the manufactured briquets would tend to stick to each other when piled together; and further the briquets would be apt to be cracked due to the emission of the volatile matter, and changed their shape, resulting in the difficulty of obtaining high quality coke finally in the molded form. On the other hand, if the content range of the n-hexane soluble matter is less than the above-mentioned, the asphalt, even though used in excessive amounts, would have poor binding ability in its blends with coal dust, and tend to possibly degrade during the heat-cure treatment.

It is an object of the invention to provide a method for manufacturing from blended coal dust and asphalt high quality briquets which have a high density, hard, crack-free and porous structure as well as sufficient strength and are useful as a fuel in the blast furnace.

It is another object of the invention to provide a method for manufacturing from the briquets previously obtained high quality coke in the molded form which have a similar structure and properties, useful also as a fuel reductant in the blast furnace.

The invention will further be explained in accordance with the following specific embodiment thereof.

The asphalt of the kind as described above is blended with a quality coal, such as anthracite, dust or coke breeze or their mixture in a proportion of 10–20 to 90–80 parts by weight. This proportion has been decided in view of the facts that the use of the asphalt in a greater proportion makes the resulting products reduce their strength, while its use in a smaller proportion tends to cause cracking during the heating process and make devolatilization difficult, and also make the resulting products reduce their strength, and moreover that the increased amounts of the asphalt used is no longer economical.

The blends of asphalt and coal dust are subjected to kneading at temperatures of 200°–300°C, to produce paste-like mass, which is then subjected to further heat-kneading while being blown at 200°–300°C for a short period till it makes numerous small granules. The granules have their surfaces a little hard, uneven, and polygon-shaped, those of big size having a porous structure. The curing of the asphalt-coal dust blend may be completed in a shortened period of time, if carried out in the presence of the hot blow. In contrast thereto, the curing of the same blends in the absence of the hot blow needs as long as about 4 hours. The mechanism of these curing activities has not been clarified, but it is presumed that the hot blow could serve to activate the contact of the asphalt component with the coal dust surfaces, resulting in the acceleration of the curing.

The granulated blends thus prepared are then charged to a usual briqueting machine for molding at temperatures of 80°–100°C under pressures of 100–400 kg/cm$^2$, to produce briquets having a high density structure full of pores for allowing heavy hydrocarbon and hydrogen gases generated during the heat-compression-molding process to pass through as well as sufficient strength.

These briquets may be treated in an oven of oxidizing atmosphere at temperatures of 200°–280°C, so that they are oxidized deep inside in a short period of time, to have the asphalt component further cured and solidifed, and the resulting products will be made more hard.

The briquets thus far manufactured is subjected to dry distillation in an inert atmosphere, free of oxidization, at temperatures of 900°–1,400°C, thereby to reduce the volatile matter to coking. The resulting products are high quality coke in the briquet form free of cracking and deformity taking place during the heating process.

The invention will further be illustrated by the following examples, which should not be construed as limiting the scope of the invention. Samples of the asphalt as employed in the examples are of straight asphalt derived from the crude oil produced in Kuwait (Penetration: 85–100; R & B: 104°–140°F; Thermal loss: below 1 percent at 325°F in 5 hrs.). Samples of the coal dust/granules as employed in the examples are from the anthracite produced in South Korea (Mesh: below 28; Ash: 17.7 percent; Volatile matter: 0.8 percent; Fixed carbon: 81.5 percent. Parts specified in the examples are all on a weight basis.

EXAMPLE 1

15 parts of a binding component-controlled asphalt containing 55 percent *n*-hexane-soluble matter and 85 parts of coal dust were kneaded together in a carbon mixer of two arm type for 10 minutes. The kneaded blend was subjected to further kneading for 1 hour with air blow heated up to 200°C, to produce small granules therefrom. The granules were applied to an ordinary briqueting machine for molding under presure of 400 kg/cm$^2$. The molded articles thus prepared were then subjected to curing in a hot blow atmosphere at 250°C for 30 minutes, to produce finished briquets. These briquets were subjected to calcination at temperatures at 1,000°C, to finally obtain coke in the molded form. The coke in the molded form thus manufactured is proved to be suitable for use in blast furnaces, with the squeeze strength of 162 kg/cm$^2$, as compared to commercially available blast furnace coke having a squeeze strength in the range of 80–120 kg/cm$^2$.

EXAMPLE 2

20 parts of a binding component-controlled asphalt containing 64 percent *n*-hexane-soluble matter and 80 parts of coal dust were treated in the same manner as in Example 1 for the production of briquets, with the sole exception that the air blow heated up to 250°C was applied for the kneading for 2 hours to produce granulated blends. The briquets thus obtained were subjected to calcination at temperatures at 1,050°C, to manufacture finished coke in the molded form. The molded coke exhibited the squeeze strength of 86 kg/cm$^2$.

COMPARATIVE EXAMPLE 1

For comparative purposes, 15 parts of asphalt containing 70.4 percent *n*-hexane-soluble matter and 85 parts of coal dust were kneaded together in the same mixer with air blow heated up to 250°C for 1.5 hours. The kneaded material was then subjected to molding in the same manner and condition as in Example 1, and the resulting articles were cured in a hot blow atmosphere at 230°C for 1.5 hours, to produce finished briquets. These briquets were subjected to calcination at temperatures at 1,050°C, to finally obtain coke in the molded form.

The coke in the molded form thus manufactured has a far lower squeeze strength, i.e., 11 kg/cm$^2$, which is unsuitable for practical appliance.

COMPARATIVE EXAMPLE 2

For further comparative purposes, 25 parts of asphalt containing 40 percent *n*-hexane soluble matter and 75 parts of coal dust were kneaded together in the same mixer with air blow heated up to 200°C for 30 minutes. The kneaded material was then subjected to molding in the same manner and conditions as in Example 1. The resulting articles were placed in the hot blow atmosphere for the second curing, which shortly thereafter became disintegrated.

EXAMPLE 3

15 parts of such asphalt that had been heated at 380°C under normal pressure for 30 minutes to have 60 percent *n*-hexane soluble matter and 85 parts of coal dust and granules were kneaded together in a carbon mixer of two arm type at 250°C for 5 minutes, to obtain a uniformly, well blended paste-like material. This paste-like blend was subjected to further kneading for 20 minutes in hot air heated at 250°C, being introduced from a piping provided through the lid of the mixer, to produce a little hard granules sized below 2–3 mm in diameter, with polygon-shaped surfaces. These granules thus obtained were cooled to 80°C and, at that temperature and pressure of 200 kg/cm$^2$, processed into the form of briquet, sized 50 × 45 mm. The briquets were then kept in a hot blow atmosphere heated up to 200°–280°C for 3 hours and, thereafter, subjected to dry distillation in an oven which was heated gradually up to 1,000°C for 30 minutes, to finally produce coke in the molded form.

The thus produced coke in the molded form has the squeeze strength of 155 kg/cm$^2$, shatter index of 92 percent on at least 40 mm shieve, and the drum index of 96 (Revolution: 15/min; Shieve: 30 mm), and is proved to be sufficiently suitable for use in blast furnaces.

EXAMPLE 4

The same samples of asphalt and coal dust as of Example 1 were kneaded in the same mixer at 200°C for 10 minutes, to produce a uniformly, well blended paste-like material. This paste was subjected to further kneading for 40 minutes in hot air kept at 200°C, being introduced from a piping provided through the lid of the mixer, to produce numerous granules of below 2–3 mm in size. These granules thus obtained were cooled to 80°C and, at that temperature and under pressure of 400 kg/cm$^2$, processed into the form of briquet, sized 20 × 20 mm. The briquets were kept in a hot blow atmosphere heated up to 250°C for 1.5 hours and, thereafter, subjected to dry distillation in an over kept at 1,000°C for 30 minutes, to finally produce coke in the molded form.

The thus produced coke in the molded form exhibits the squeeze strength of 180 kg/cm$^2$.

What is claimed is:

1. A method of manufacturing briquets which comprises blending 10–20 parts by weight of asphalt containing 55–65 percent $n$-hexane soluble matter and having a controlled binding component with 90–80 parts by weight of coal material selected from the group consisting of coal dust and coke breeze, kneading the blend at temperatures of 200°–300°C to produce a pasty material, which is further kneaded in hot blows heated at temperatures of 200°–300°C till granulation is completed, and finally subjecting the resulting granules to heat-compression molding, to form the briquets.

2. The method as claimed in claim 1 wherein said heat-compression molding is carried out at temperatures 80°–100°C under pressure of 100–400 kg/cm$^2$.

3. A method of manufacturing coke in the molded form which comprises blending 10–20 parts by weight of asphalt containing the $n$-hexane soluble matter in the range of 55–65 percent and having a controlled binding component with 90–80 parts by weight of a coal material selected from the group consisting of coal dust and coke breeze, kneading the blend at temperatures of 200°–300°C to produce a pasty material, which is further kneaded in air blows heated at temperatures of 200°–300°C till granulation is completed, subjecting the resulting granules to heat-compression molding to form briquets, curing the resulting briquets at temperatures of 200°–280°C in the oxidizing atmosphere, and finally calcining the oxidized briquets at temperatures of 900°–1,400°C in an inert gas to produce coke in the molded form.

4. The method as claimed in claim 3 wherein said heat-compression molding is carried out at temperatures of 80°–100°C under pressure of 100–400 kg/cm$^2$.

* * * * *